(12) United States Patent
Ohnishi et al.

(10) Patent No.: US 9,269,335 B2
(45) Date of Patent: Feb. 23, 2016

(54) INSTALLATION STRUCTURE FOR ACOUSTIC TRANSDUCER

(71) Applicant: Yamaha Corporation, Hamamatsu-Shi, Shizuoka-Ken (JP)

(72) Inventors: Kenta Ohnishi, Hamamatsu (JP); Tadaharu Kato, Hamamatsu (JP); Hiroyuki Murakami, Kakegawa (JP); Yuji Takahashi, Hamamatsu (JP); Yoshiya Matsuo, Hamamatsu (JP); Shinji Sumino, Hamamatsu (JP)

(73) Assignee: Yamaha Corporation, Hamamatsu-Shi, Shizuoka-Ken (JP)

( * ) Notice: Subject to any disclaimer, the term of this patent is extended or adjusted under 35 U.S.C. 154(b) by 0 days.

(21) Appl. No.: 14/593,063

(22) Filed: Jan. 9, 2015

(65) Prior Publication Data

US 2015/0206514 A1   Jul. 23, 2015

(30) Foreign Application Priority Data

Jan. 22, 2014   (JP) .................... 2014-009540

(51) Int. Cl.
*G10H 3/14*   (2006.01)
*G10C 3/06*   (2006.01)
(Continued)

(52) U.S. Cl.
CPC . *G10C 3/06* (2013.01); *F16C 11/06* (2013.01); *F16C 11/0671* (2013.01); *G10H 1/32* (2013.01); *G10H 3/22* (2013.01)

(58) Field of Classification Search
CPC ....... G10H 1/0058; G10H 3/185; G10H 3/00; G10H 1/344; G10H 3/14; G10H 3/186; G10K 9/20; G10K 11/1788; G01H 11/02; G01H 17/00; H02N 2/001; H01F 7/02763; H01F 7/06; H01F 7/066; H01F 5/00; G10D 3/08; H03H 9/02259; H03H 9/125; G10F 1/16; G10F 1/00
See application file for complete search history.

(56) References Cited

U.S. PATENT DOCUMENTS 5,703,553  A      12/1997  Bushko et al.
2003/0015086  A1*  1/2003  Katz ................. G10H 1/32
                                                      84/644

(Continued)

FOREIGN PATENT DOCUMENTS

EP    2 571 016 A2    3/2013
EP    2 793 221 A1    10/2014
(Continued)

OTHER PUBLICATIONS

Office Action of Taiwan application No. 102147003 dated Mar. 24, 2015 with English translation.

(Continued)

*Primary Examiner* — Marlon Fletcher
(74) *Attorney, Agent, or Firm* — Dickstein Shapiro LLP

(57) ABSTRACT

An installation structure for an acoustic transducer configured to push and pull a vibrated body and having a magnetic-path forming portion; a vibrating unit; and a connector having at least one joint portion configured to connect two members such that axes of the two members are inclined relative to each other by bending at the at least one joint portion, the at least one joint portion having an urging portion configured to generate an urging force by which a pushing-side driving portion of a first member connected to one side of the at least one joint portion urges a pushing-side driven portion of a second member connected on another side of the at least one joint portion in a pushing direction and an urging force by which a pulling-side driving portion of the first member urges a pulling-side driven portion of the second member in a pulling direction.

15 Claims, 9 Drawing Sheets

(51) Int. Cl.
    *F16C 11/06*     (2006.01)
    *G10H 1/32*     (2006.01)
    *G10H 3/22*     (2006.01)

(56) References Cited

U.S. PATENT DOCUMENTS

| | | | | |
|---|---|---|---|---|
| 2004/0226431 | A1* | 11/2004 | Shirayanagi | G10C 3/02 84/177 |
| 2005/0081703 | A1* | 4/2005 | Hoover | G10H 3/26 84/726 |
| 2007/0142697 | A1 | 6/2007 | Schneider | |
| 2010/0013574 | A1* | 1/2010 | Huang | H03H 3/0072 333/186 |
| 2013/0061733 | A1 | 3/2013 | Ohnishi et al. | |
| 2015/0163571 | A1* | 6/2015 | Satomi | H04R 1/00 381/162 |
| 2015/0206514 | A1* | 7/2015 | Ohnishi | G10C 3/06 84/725 |

FOREIGN PATENT DOCUMENTS

| | | |
|---|---|---|
| GB | 251663 A | 10/1926 |
| JP | S59-500531 A | 3/1984 |
| JP | H04-500735 A | 2/1992 |
| JP | 2000-315088 A | 11/2000 |
| JP | 2008-298992 A | 12/2008 |
| JP | 2010-7835 A | 1/2010 |
| JP | 2012-230406 A | 11/2012 |
| JP | 2014-14208 A | 8/2014 |
| TW | 466468 B | 12/2001 |
| WO | WO 83/03022 A1 | 9/1983 |
| WO | WO-90/03025 A1 | 3/1990 |
| WO | WO-2013/089239 A1 | 6/2013 |
| WO | WO 2014/115482 A1 | 7/2014 |

OTHER PUBLICATIONS

Non-Final Office Action mailed Nov. 10, 2015 in U.S. Appl. No. 14/762,611.

\* cited by examiner

INSTALLATION STRUCTURE FOR ACOUSTIC TRANSDUCER

CROSS REFERENCE TO RELATED APPLICATION

The present application claims priority from Japanese Patent Application No. 2014-009540, which was filed on Jan. 22, 2014, the disclosure of which is herein incorporated by reference in its entirety.

BACKGROUND OF THE INVENTION

1. Field of the Invention

The present invention relates to an installation structure for an acoustic transducer configured to operate in accordance with an audio signal for thereby vibrating a vibrated body so as to permit the vibrated body to generate sounds.

2. Description of Related Art

Conventional devices such as keyboard musical instruments are known in which an acoustic transducer operates in accordance with an audio signal to thereby vibrate a vibrated body, so that the vibrated body generates sounds. For instance, a keyboard musical instrument is provided with: the acoustic transducer fixed to a back post via a support member; and a movable unit (vibrating unit) connected to a soundboard that functions as the vibrated body to be vibrated. The movable unit is configured to vibrate when an electric current in accordance with the audio signal is supplied to a coil. The vibration of the vibrating unit is transmitted to the soundboard, so that the soundboard is vibrated to thereby generate sounds.

The following Patent Literature 1 describes an installation structure for the acoustic transducer provided in the keyboard musical instrument. In the disclosed structure, the vibrating unit in the form of a rod-like hammer is electromagnetically coupled to a magnetic-path forming portion having a magnet, a core, and so on. When an electric current is supplied to the coil, the vibrating unit reciprocates in its axial direction, so that the vibrating unit vibrates. The vibrating unit is fixedly bonded at its distal end portion to a flange fixed to the soundboard.

Patent Literature 1: Japanese Unexamined Patent Application Publication (Translation of PCT Application) No. 04-500735

SUMMARY OF THE INVENTION

The vibrated body such as the soundboard may suffer from a dimensional change or deformation due to changes over time by influences of the temperature and the humidity. In particular when the vibrated body is displaced in the horizontal direction perpendicular to a vibration direction in which the vibrating unit vibrates and the flange is accordingly displaced in the horizontal direction, the distal end portion of the vibrating unit is displaced in the horizontal direction together with the flange. When the amount of displacement becomes large to a certain extent, the vibrating unit and the magnetic-path forming portion may physically interfere with each other or electromagnetic coupling therebetween may fail, causing operation failure of the vibrating unit. In this instance, there may be a risk that the vibration is not appropriately transmitted and thus sounds are not appropriately generated. That is, the function of the acoustic transducer to vibrate the vibrated body cannot be maintained.

It is thus necessary to enable vibration of the vibrating unit to be transmitted to the vibrated body such as the soundboard even when the vibrated body is displaced in the horizontal direction to a certain degree. In view of this, the applicant of the present invention has conceived a configuration in which the vibrated body and the vibrating unit are connected via a permissible mechanism such as a joint that permits the displacement of the vibrated body. For instance, the vibrated body and the vibrating unit are connected by the permissible mechanism or by a plurality of members having such a mechanism. However, if the permissible mechanism suffers from any space in the vertical direction between its components that are movable relative to each other, vibration of the vibrating unit is not properly transmitted. In this case, it is difficult to attain an accurate vibrating function. In addition, there is a risk of an occurrence of noise. Though such a space may originally exist during a production stage, the space is likely to be formed as a result of changes over time due to deformation or wear in a long-term use.

The present invention has been developed to solve the conventionally experienced problems. It is therefore an object of the invention to provide an installation structure for an acoustic transducer that does not suffer from an occurrence of noise and ensures a highly accurate vibrating function, over a long period of time.

The above-indicated object may be attained according to one aspect of the invention, which provides an installation structure for an acoustic transducer (50) configured to operate in accordance with an audio signal and to push and pull a vibrated body (7) in predetermined directions for thereby vibrating the vibrated body, so as to permit the vibrated body to generate sounds, comprising: a magnetic-path forming portion (52) fixedly disposed relative to a fixedly supporting portion (55) and forming a magnetic path; a vibrating unit (200) having an electromagnetic coupling portion (EM) electromagnetically coupled to the magnetic-path forming portion, the vibrating unit being configured to vibrate in the predetermined directions when the electromagnetic coupling portion is driven by the magnetic-path forming portion in response to a drive signal based on the audio signal; a connector having at least one joint portion (J1, J2) configured to connect two members such that axes of the two members are inclined relative to each other by bending at the at least one joint portion, the connector connecting (a) a part of the vibrated body or a fixed portion (111) fixed to the vibrated body and (b) the vibrating unit, wherein a first member (91, 101) that is connected to the at least one joint portion on one of opposite sides thereof nearer to the fixedly supporting portion is provided with a pushing-side driving portion (UA) to drive the vibrated body in a pushing direction of the predetermined directions and a pulling-side driving portion (DA) to drive the vibrated body in a pulling direction of the predetermined directions, wherein a second member (101, 111, 7) that is connected to the at least one joint portion on the other of the opposite sides thereof nearer to the vibrated body is provided with a pushing-side driven portion (ub, 72a) to be driven by the pushing-side driving portion in the pushing direction and a pulling-side driven portion (db, 61a; 72b) to be driven by the pulling-side driving portion in the pulling direction, and wherein the at least one joint portion has an urging portion (61; 62; 63; 64; 65; 66; 69; 67; 68) configured to generate an urging force by which the pushing-side driven portion is urged by the pushing-side driving portion in the pushing direction and an urging force by which the pulling-side driven portion is urged by the pulling-side driving portion in the pulling direction.

The above-indicated object may be attained according to another aspect of the invention, which provides an installation structure for an acoustic transducer configured to operate in accordance with an audio signal and to push and pull a vibrated body (7) in predetermined directions for thereby vibrating the vibrated body, so as to permit the vibrated body to generate sounds, comprising: a magnetic-path forming portion (52) fixedly disposed relative to a fixedly supporting portion (55) and forming a magnetic path: a vibrating unit (200) having an electromagnetic coupling portion (EM) electromagnetically coupled to the magnetic-path forming portion, the vibrating unit being configured to vibrate in the predetermined directions when the electromagnetic coupling portion is driven by the magnetic-path forming portion in response to a drive signal based on the audio signal; and a connector having at least one joint portion (J1, J2) configured to connect two members such that axes of the two members are inclined relative to each other by bending at the at least one joint portion, the connector connecting (a) a part of the vibrated body or a fixed portion (111) fixed to the vibrated body and (b) the vibrating unit. The at least one joint portion may have: a first member (91 (172), 101) located on one of opposite sides of the at least one joint portion nearer to the fixedly supporting portion; a second member (72 (101), 71, 74, 77, 76, 111, 7) located on the other of the opposite sides of the at least one joint portion nearer to the vibrated body; a spherical portion (92, 102; 192) fixed to one (91, 101) of the first member and the second member, the spherical portion contacting the other (72, 74, 172) of the first member and the second member; and a pushing portion (61, 62 (71), 63 (71), 64, 65, 67) fixed to the other (72, 172) of the first member and the second member, the pushing portion being configured to push the spherical portion onto the other (72, 172) of the first member and the second member in a state in which the pushing portion is in contact with the spherical portion.

The reference numerals in the brackets attached to respective constituent elements in the above description correspond to reference numerals used in the following embodiment and modified examples to identify the respective constituent elements. The reference numerals attached to each constituent element indicates a correspondence between each element and its one example, and each element is not limited to the one example.

BRIEF DESCRIPTION OF DRAWINGS

The above and other objects, features, advantages and technical and industrial significance of the present invention will be better understood by reading the following detailed description of an embodiment of the invention, when considered in connection with the accompanying drawings, in which.

DETAILED DESCRIPTION OF THE EMBODIMENT

There will be explained one embodiment of the invention with reference to the drawings.

Figure 1:
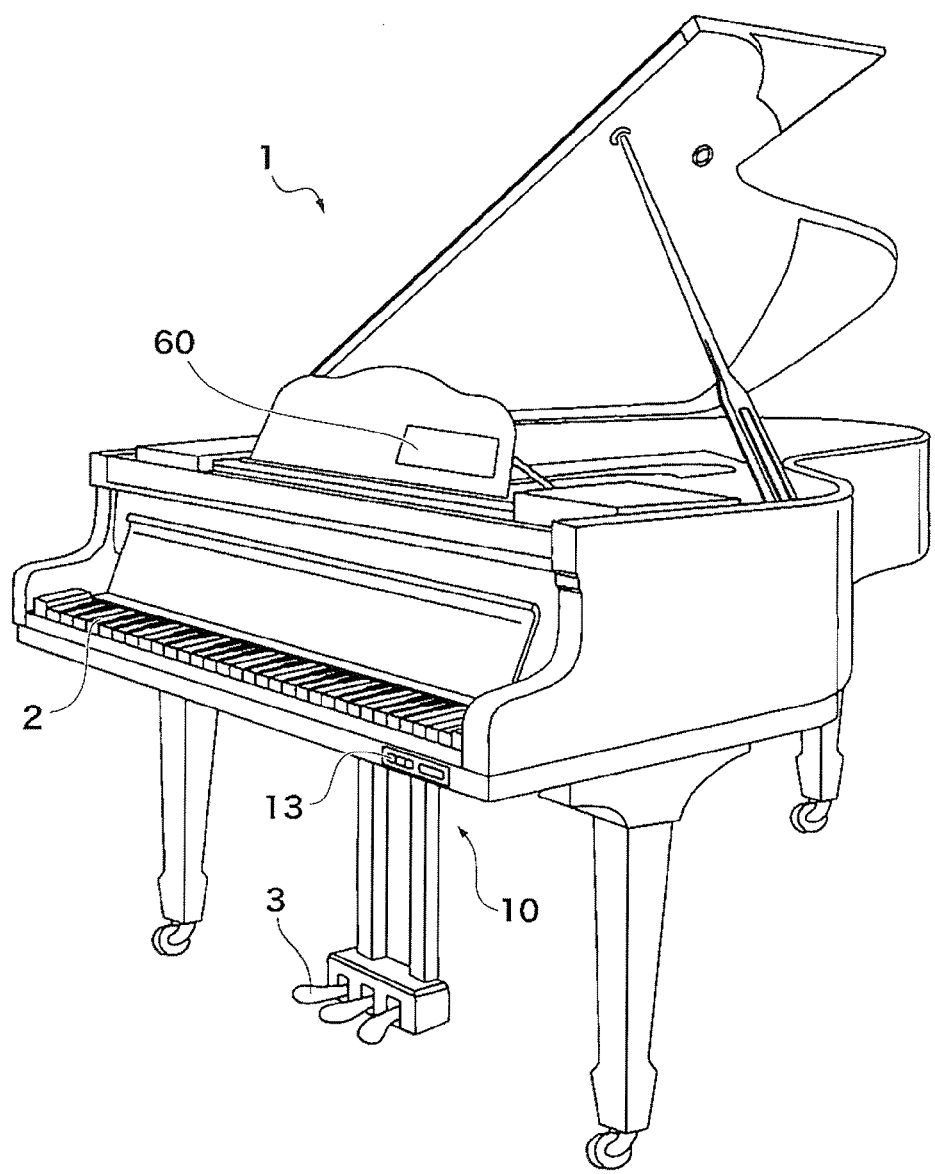
FIG. 1 is a perspective view showing an external appearance of a grand piano to which is applied an installation structure for an acoustic transducer according to one embodiment of the invention.

The perspective view of FIG. 1 shows a keyboard musical instrument in the form of a grand piano 1 as one example of devices and musical instruments to which is applied an installation structure for an acoustic transducer according to one embodiment of the invention. The acoustic transducer is configured to operate in accordance with an audio signal for thereby vibrating a vibrated body, so as to permit the vibrated body to generate sounds. A soundboard 7 is illustrated as one example of the vibrated body to be vibrated. It is noted the devices to which the present installation structure is applied is not limited to the grand piano 1 and the vibrated body is not limited to the soundboard 7. That is, the invention is applicable to any structure in which the acoustic transducer is driven in accordance with a drive signal based on the audio signal and the vibrated body is thereby vibrated for generating sounds.

The grand piano 1 has a keyboard and pedals 3 on its front side. The keyboard has a plurality of keys 2 that are operated by a performer (user) for performance. The grand piano 1 further has a controller 10 having an operation panel 13 on its front surface portion and a touch panel 60 provided on a music stand. User's instructions can be input to the controller 10 by a user's operation on the operation panel 13 and the touch panel 60. The user's instructions may be input to the controller 10 using other user interfaces in place of the operation panel 13 and the touch panel 60.

Figure 2:
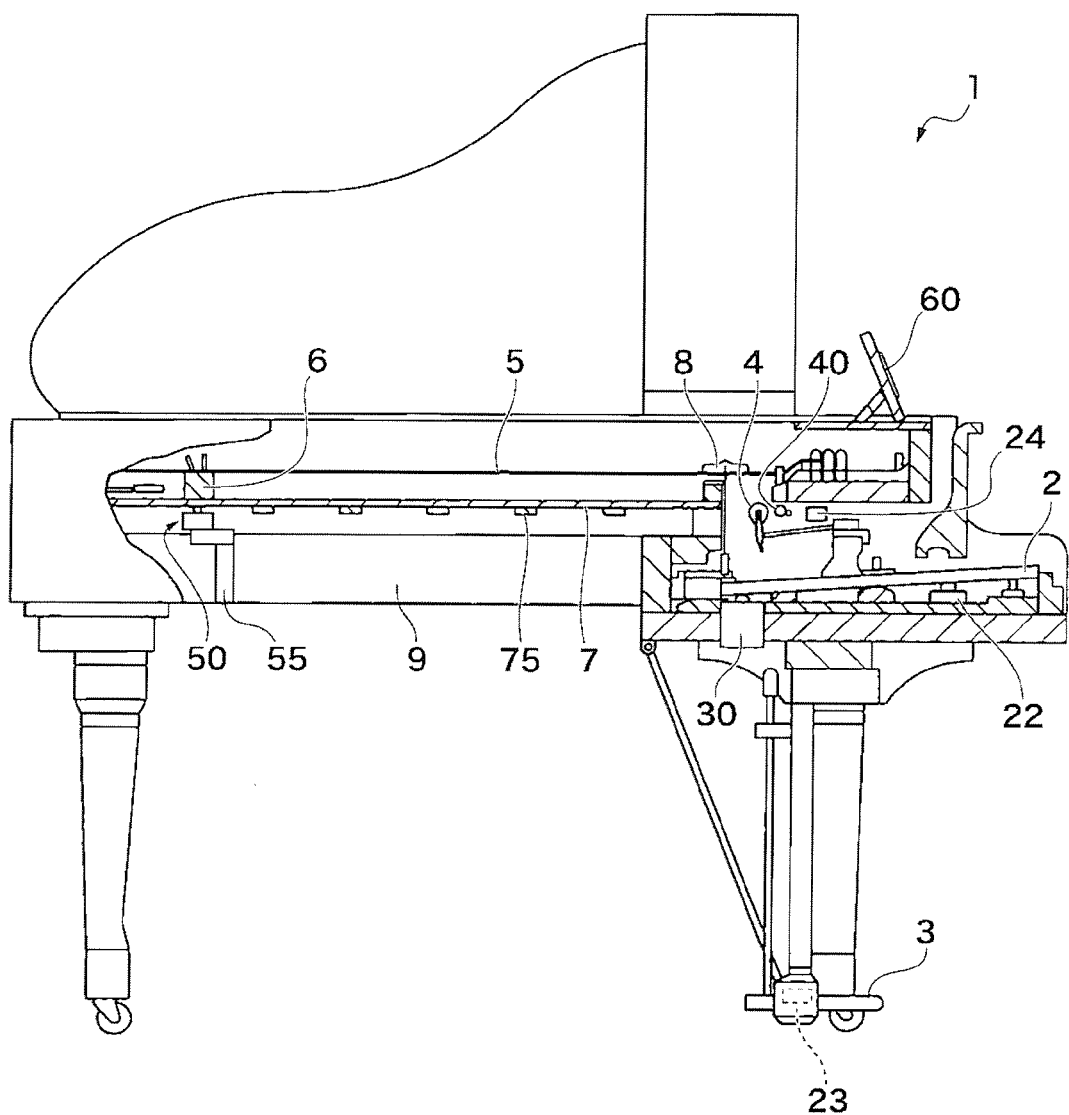
FIG. 2 is a cross-sectional view showing an internal structure of the grand piano.

In the cross-sectional view of FIG. 2 showing an internal structure of the grand piano 1, structures provided for each of the keys 2 are illustrated focusing on one key 2, and illustration of the structures for other keys 2 is omitted. A key drive unit 30 is provided below a rear end portion of each key 2 (i.e., on a rear side of each key 2 as viewed from the user who plays the piano 1 on the front side of the piano 1). The key drive unit 30 drives the corresponding key 2 using a solenoid.

The key drive unit 30 drives the solenoid in accordance with a control signal sent from the controller 10. That is, the key drive unit 30 drives the solenoid such that a plunger moves upward to reproduce a state similar to that when the user has depressed the key and such that the plunger moves downward to reproduce a state similar to that when the user has released the key.

Strings 5 and hammers 4 are provided so as to correspond to the respective keys 2. When one key 2 is depressed, the corresponding hammer 4 pivots via an action mechanism (not shown), so as to strike the string(s) 5 provided for the key 2. A damper 8 moves in accordance with a depression amount of the key 2 and a step-on amount of a damper pedal among the pedals 3, such that the damper 8 is placed in a non-contact state in which the damper 8 is not in contact with the string(s) 5 or in a contact state in which the damper 8 is in contact with the string(s) 5. A stopper 40 operates when a string-striking preventive mode is set in the controller 10. More specifically, the stopper 40 stops an upward movement of the corresponding hammer 4 to strike the string(s) 5, thereby preventing the string(s) 5 from being struck by the hammer 4.

Key sensors 22 are provided for the respective keys 2. Each key sensor 22 is disposed below the corresponding key 2 to output, to the controller 10, a detection signal in accordance with the behavior of the corresponding key 2. Hammer sensors 24 are provided for the respective hammers 4. Each hammer sensor 24 outputs, to the controller 10, a detection signal in accordance with the behavior of the corresponding hammer 4. Pedal sensors 23 are provided for the respective pedals 3. Each pedal sensor 23 outputs, to the controller 10, a detection signal in accordance with the behavior of the corresponding pedal 3.

While not shown, the controller 10 includes a CPU, a ROM, a RAM, a communication interface, and so on. The CPU executes control programs stored in the ROM for enabling the controller 10 to perform various controls.

The soundboard 7 is a wooden plate-shaped member, and soundboard ribs 75 and bridges 6 are attached to the soundboard 7. The strings 5 stretched under tension partially engage the bridges 6. In this structure, vibration of the soundboard 7 is transmitted to the strings 5 via the bridges 6 while vibration of the strings 5 is transmitted to the soundboard 7 via the bridges 6.

In the grand piano 1, acoustic transducers 50 are connected indirectly to the soundboard 7 such that each acoustic transducer 50 is supported by a corresponding support member 55 (as one example of a fixedly supporting portion) connected to a hack post 9. Each support member 55 is formed of metal such as an aluminum material. The back posts 9 cooperate with a frame to support the tension of the strings 5 and constitute a part of the grand piano 1.

Figure 3:
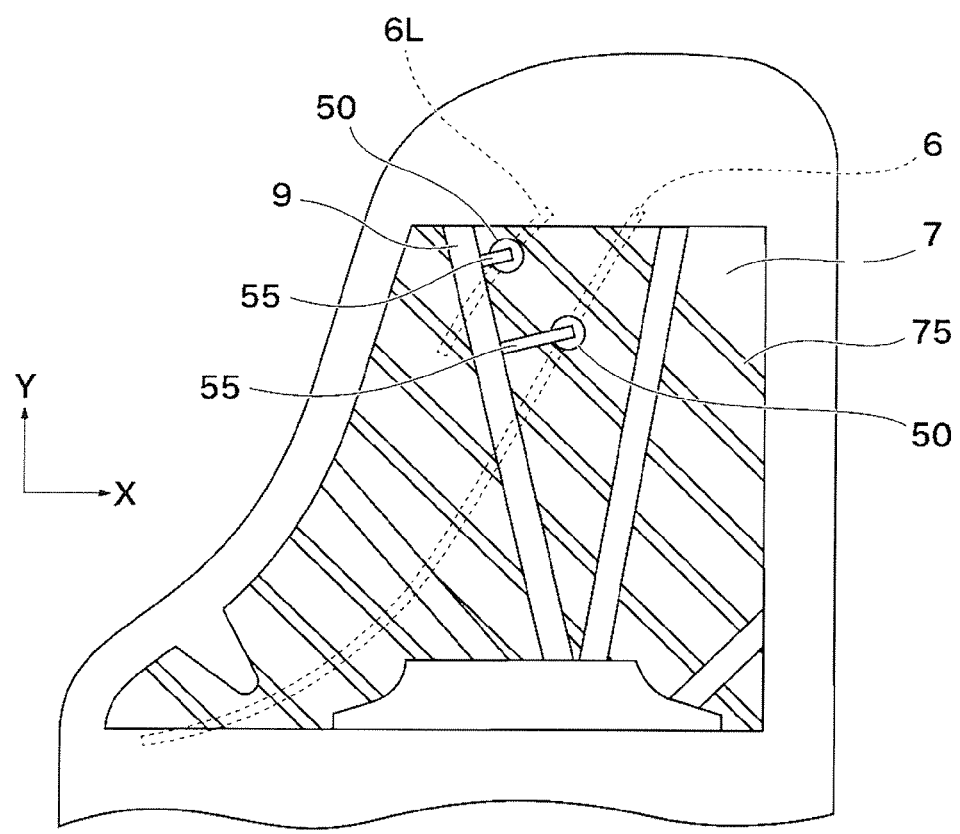
FIG. 3 is a view showing a back surface of a soundboard for explaining positions at which the acoustic transducers are installed.

FIG. 3 is a view showing a back surface of the soundboard 7 for explaining positions at which the acoustic transducers 50 are installed.

Each acoustic transducer 50 is connected to the soundboard 7 and is disposed between adjacent two of a plurality of soundboard ribs 75 attached to the soundboard 7. In FIG. 3, a plurality of e.g., two acoustic transducers 50 having the same structure are connected to the soundboard 7. Only one acoustic transducer 50 may be connected to the soundboard 7. Each acoustic transducer 50 is disposed at a position as close as possible to the bridge 6. In the present embodiment, the acoustic transducer 50 is disposed at a position of the back surface of the soundboard 7 at which the acoustic transducer 50 is opposed to the bridge 6 with the soundboard 7 interposed therebetween. In the following explanation, a left-right direction, a front-rear direction, and an up-down (vertical) direction as viewed from a performer's side of the grand piano 1 are respectively referred to as "X-axis direction", "Y-axis direction" and "Z-axis direction". The Z-axis direction is one example of predetermined directions. The X-axis direction and the Y-axis direction (X-Y direction) correspond to the horizontal direction.

Figures 4A, 4B:
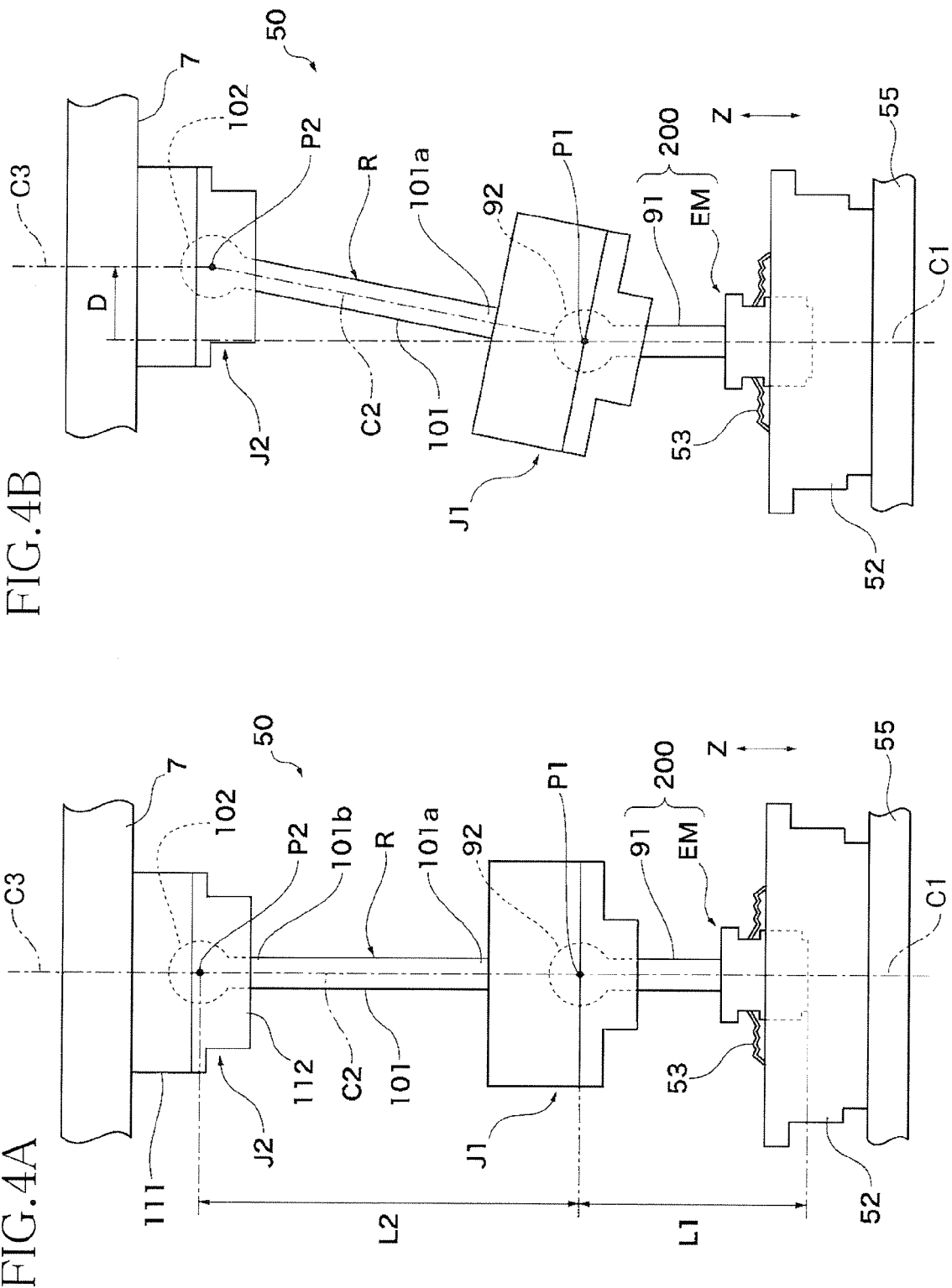
FIG. 4A is a side view of an acoustic transducer connected to a soundboard at the time of shipment and FIG. 4B is a side view of the acoustic transducer suffered from changes over time.

Each of FIGS. 4A and 4B is a side view showing a state in which the acoustic transducer 50 fixed to the support member 55 is connected to the soundboard 7. FIG. 4 shows a state of the acoustic transducer 50 at the time of shipment while FIG. 4B shows a state of the acoustic transducer 50 after having suffered from changes over time.

The acoustic transducer 50 is an actuator of a voice-coil type and is mainly constituted by a magnetic-path forming portion 52, a vibrating unit (movable unit) 200, and a connecting member R. The magnetic-path forming portion 52 is fixedly disposed relative to back post 9 via the support member 55. In other words, the magnetic-path forming portion 52 is in a fixed state relative to the back post 9. The vibrating unit 200 includes an electromagnetic coupling portion EM that is electromagnetically coupled to the magnetic-path forming portion 52 and a rod portion 91 that extends upward from the electromagnetic coupling portion EM. When a drive signal based on the audio signal is input to the magnetic-path forming portion 52, the electromagnetic coupling portion EM is driven by the magnetic-path forming portion 52, so as to vibrate in the Z-axis direction.

In the present embodiment, the soundboard 7 and the vibration unit 200 are connected by a joint portion J configured to permit two members connected thereto such that axes of the two members are inclined relative to each other by bending at the joint portion J. Two joint portions J, i.e., a first joint portion J1 and a second joint portion J2, are used in the present embodiment.

The connecting member R has a rod portion 101. The connecting member R is disposed between the soundboard 7 and the vibration unit 200 for transmitting vibration of the vibration unit 200 to the soundboard 7. The second joint portion J2 having a pointer member 111 and a chuck member 112 is fixed to the soundboard 7.

At the time of shipment, the electromagnetic coupling portion EM is positioned relative to the horizontal direction (the X-Y direction) by a damper 53 such that an axis C2 of the rod portion 101 of the connecting member R is coaxial with, namely, aligns with, an axis C1 of the magnetic-path forming portion 52. At the time of shipment, an axis C3 of the pointer member 111 is coaxial with, namely, aligns with, the axis C2 of the rod portion 101. The axes C1, C3 are parallel to an axis in the Z-axis direction that coincides with a vibration direction in which the vibrating unit 200 vibrates, namely, the axes C1, C3 are parallel to the Z axis. The magnetic-path forming portion 52 will be later explained in detail.

The vibration unit 200 and the connecting member R are connected such that bending at the first joint portion J1 enables the axis C1 and the axis C2 to be inclined relative to each other. The connecting member R and the soundboard 7 are connected such that bending at the second joint portion J2 enables the axis C2 and the axis C3 to be inclined relative to each other.

While the structure of the first joint portion J1 and the second joint portion J2 will be explained in detail, each of the joint portions J1, J2 has a ball joint structure. A first end portion 101*a* of the connecting member R that is a lower end portion of the rod portion 101 is fixed to the first joint portion J1, and a spherical portion 92 provided at an upper end of the rod portion 91 is rotatable in the first joint portion J1. A spherical portion 102 provided at an upper end of a second end portion 101*b* of the rod portion 101 of the connecting member R is rotatable in the second joint portion J2.

The connecting member R is rotatable about any axis perpendicular to the Z axis while a first pivot point P1 of the first joint portion J1 serves as a pivot center. Thus, the connecting member R is inclinable relative to the axis C1 of the vibrating unit 200 that coincides with the Z axis, owing to bending at the first joint portion J1. The connecting member R is also rotatable about any axis perpendicular to the Z axis while a second pivot point P2 of the second joint portion J2 serves as a pivot center. Consequently, the connecting member R is inclinable relative to the Z axis owing to bending at the second joint portion J2. The motion that causes bending at the first joint portion J1 and the second joint portion J2 is substantially a pivotal motion.

The best way to ensure appropriate electromagnetic coupling between the magnetic-path forming portion 52 and the electromagnetic coupling portion EM is to align the axis C2 of the connecting member R and the axis C1 of the magnetic-path forming portion 52 with each other. In other words, the axis C2 and the axis C1 are in coaxial alignment with each other for appropriate electromagnetic coupling. However, when the soundboard 7 suffers from a dimensional change or deformation due to changes over time, a portion to which the connecting member R is connected, in other words, the pointer member 111 fixed to the soundboard 7, may also be displaced in the horizontal direction. If the pointer member 111 is displaced in the horizontal direction to such an extent that a relative position of the electromagnetic coupling portion EM in the horizontal direction cannot be retained by the damper 53, the positional relationship between the electromagnetic coupling portion EM and the magnetic-path forming portion 52 would become inappropriate, causing a risk that the vibrating unit 200 fails to vibrate appropriately.

In view of this, it is required to provide a displacement absorbing mechanism for preventing the position, in the horizontal direction, of the electromagnetic coupling portion EM relative to the magnetic-path forming portion 52 from being changed even if the soundboard 7 suffers from a horizontal displacement over time. It is impossible to unlimitedly deal with the horizontal displacement of the soundboard 7. However, because the amount of displacement of the soundboard 7 over time can be estimated, it is only required to absorb the displacement in the estimated (predetermined) range.

It is rather difficult to realize the problem described above at an initial stage of usage of the product. In addition, it is necessary to conceive a mechanism that enables the vibration transmission function in the Z-axis direction to be maintained while absorbing the dimensional change in the horizontal direction. To attain such a mechanism, a novel or unique idea is needed. According to the present embodiment, at least two joint portions J1, J2 are disposed between the soundboard 7 and the vibrating unit 200.

More specifically, when the portion of the soundboard 7 to which the connecting member R is connected is displaced in the horizontal direction within a predetermined range, e.g., within a displacement amount D shown in FIG. 4B, the second joint portion J2 is displaced relative to the back post 9 in the horizontal direction owing to bending at the joint portions J1, J2, whereby the connecting member R is inclined. In this instance, the vibrating unit 200 is neither displaced in the horizontal direction nor inclined. Consequently, the vibrating unit 200 is not displaced in the horizontal direction and is not inclined over a long period of time, so that the position, in the horizontal direction, of the spherical portion 92 relative to the magnetic-path forming portion 52 is not changed. Thus, the electromagnetic coupling between the magnetic-path forming portion 52 and the electromagnetic coupling portion EM can be appropriately maintained, and the acoustic transducer 50 maintains a good function of transmitting the vibration of the vibrating unit 200 to the soundboard 7.

As shown in FIG. 4A, a distance in the Z-axis direction between: the position of the lower end of the electromagnetic coupling portion EM; and the position of the first joint portion J1 (that is defined by the position of the first pivot point P1) is defined as L1 while a distance between the position of the first joint portion J1 and the position of the second joint portion J2 (that is defined by the position of the second pivot point P2) is defined as L2. The distance L1 is smaller than the distance L2.

Owing to the distance L1 smaller than the distance L2, the flexural rigidity of the rod portion 91 can be enhanced without a need of increasing its thickness, and the vibrating unit 200 is less likely to incline relative to the Z axis. Consequently, the position of the spherical portion 92 or the first joint portion J1 is prevented from being temporarily displaced in the horizontal direction by the drive force when the vibration is transmitted. This also makes it possible that appropriate electromagnetic coupling between the magnetic-path forming portion 52 and the electromagnetic coupling portion is maintained.

Figure 5:
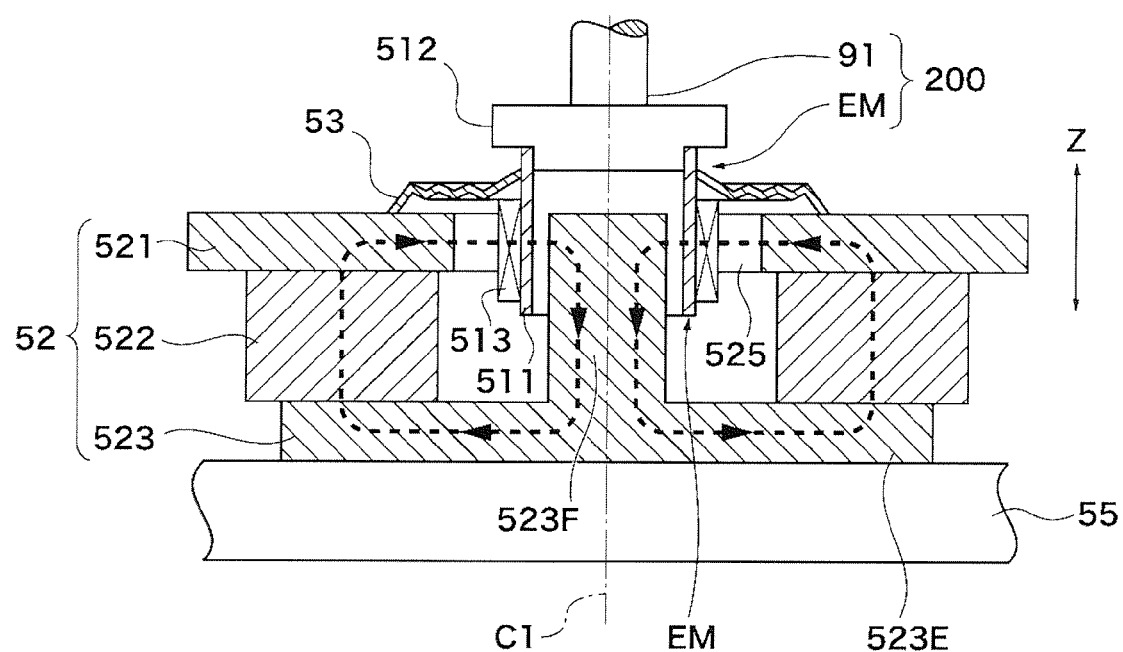
FIG. 5 is a vertical cross-sectional view showing a magnetic-path forming portion and an electromagnetic coupling portion.

FIG. 5 is a vertical cross-sectional view showing the magnetic-path forming portion 52 and the electromagnetic coupling portion EM. The electromagnetic coupling portion EM of the vibrating unit 200 includes a cap 512, a bobbin 511, and a voice coil 513. The cap 512 is fixed to the lower end portion of the rod portion 91, and the bobbin 511 having an annular shape is fixedly fitted on a lower portion of the cap 512. The voice coil 513 is constituted by conductor wires wound around the outer circumferential surface of the bobbin 511. The voice coil 513 converts, into vibration, changes in an electric current flowing in a magnetic field formed by the magnetic-path forming portion 52.

The magnetic-path forming portion 52 includes a top plate 521, a magnet 522, and a yoke 523 that are arranged in this order from the upper side. The electromagnetic coupling portion EM is supported by a damper 53 such that the electromagnetic coupling portion EM can be displaced in the Z-axis direction without contacting the magnetic-path forming portion 52. The damper 53 is formed of fiber or the like and has a disc-like shape. The damper 53 has a waved shape like bellows at its disc-like portion. The damper 53 is attached at its outer peripheral end to the upper surface of the top plate 521 and at its inner peripheral end to the bobbin 511 of the electromagnetic coupling portion EM.

The magnetic-path forming portion 52 is fixedly disposed relative to the back post 9 such that the yoke 523 is fixed to the support member 55 by screws or the like, for instance. That is, the magnetic-path forming portion 52 is in a fixed state relative to the back post. Consequently, the support member 55 has a function of permitting the magnetic-path forming portion 52 to be fixed to the back post 9 as a stationary portion.

The top plate 521 is formed of a soft magnetic material such as soft iron and has a disc-like shape having a central hole. The yoke 523 is formed of a soft magnetic material such as soft iron. The yoke 523 is constituted by a disc portion 523E and a cylindrical portion 523F having an outer diameter smaller than that of the disc portion 523E. The disc portion 523E and the cylindrical portion 523F are formed integrally with each other such that the axes of the disc portion 523E and the cylindrical portion 523F are aligned with each other. The outer diameter of the cylindrical portion 523F is smaller than an inner diameter of the top plate 521. The magnet 522 is a doughnut-shaped permanent magnet and has an inner diameter larger than the inner diameter of the top plate 521. The cylindrical portion 523F is loosely fitted in a hollow portion of the bobbin 511.

The axes of the top plate 521, the magnet 522, and the yoke 523 are aligned with one another and coincide with the axis C1 of the magnetic-path forming portion 52. This arrangement forms a magnetic path shown by arrows in the broken line in FIG. 5C. The electromagnetic coupling portion EM is disposed such that the voice coil 513 is located in a space between the top plate 521 and the cylindrical portion 523F, i.e., in a magnetic-path space 525. In this instance, the electromagnetic coupling portion EM is positioned relative to the horizontal direction, i.e., the X-Y direction, by the damper 53, such that the axis C2 of the connecting member R is coaxial with the axis C1 of the magnetic-path forming portion 52. Thus, the rod portion 91 extends in parallel with the Z-axis direction.

A drive signal based on an audio signal is input from the controller 10 to the acoustic transducer 50. For instance, audio data stored in a storage portion (not shown) is read out by the controller 10, and the drive signal is generated on the basis of the read data. Alternatively, when the soundboard 7 is vibrated in accordance with a performance operation, the behaviors of the keys 2, the pedals 3, and the hammers 4 are detected respectively by the key sensors 22, the pedal sensors 23, and the hammer sensors 24, whereby the performance operation of the player is detected. On the basis of the detection results, the controller 10 generates performance information. The controller 10 subsequently generates an acoustic signal on the basis of the performance information. The acoustic signal is processed and amplified so as to be output to the acoustic transducer 50 as the drive signal.

When the drive signal is input to the voice coil 513, the voice coil 513 receives a magnetic force in the magnetic-path space 525, and the bobbin 511 receives a drive force in the Z-axis direction in accordance with the waveform indicated by the drive signal input to the voice coil 513. Consequently, the electromagnetic coupling portion EM is driven by the magnetic-path forming portion 52, so that the vibrating unit 200 including the electromagnetic coupling portion EM vibrates in the Z-axis direction. When the vibrating unit 200 vibrates in the Z-axis direction, the vibration of the vibrating unit 200 is transmitted to the soundboard 7 by the connecting member R, so that the soundboard 7 is vibrated and sound generated by the vibration of the soundboard 7 are emitted in the air.

The structure of the joint portion J will be explained. As described above, the joint portion J (connector) enables, owing to bending thereof, the axes of the two members connected thereto to be inclined relative to each other. In the following explanation, one of the two members connected to the joint portion J on one of opposite sides of the joint portion J nearer to the back post 9 will be referred to as a "first member" while the other of the two members connected to the joint portion J on the other of the opposite sides of the joint portion J nearer to the soundboard 7 will be referred to as a "second member". For the first joint portion J1, the rod portion 91 corresponds to the first member while the rod portion 101 of the connecting member R corresponds to the second member. For the second joint portion J2, the rod portion 101 of the connecting member R corresponds to the first member while the soundboard 7 or the pointer member 111 corresponds to the second member. The same configuration is applicable to both of the first and second joint portions J1, J2, and the following explanation will be made with respect to the first joint portion J1.

Figure 6A:
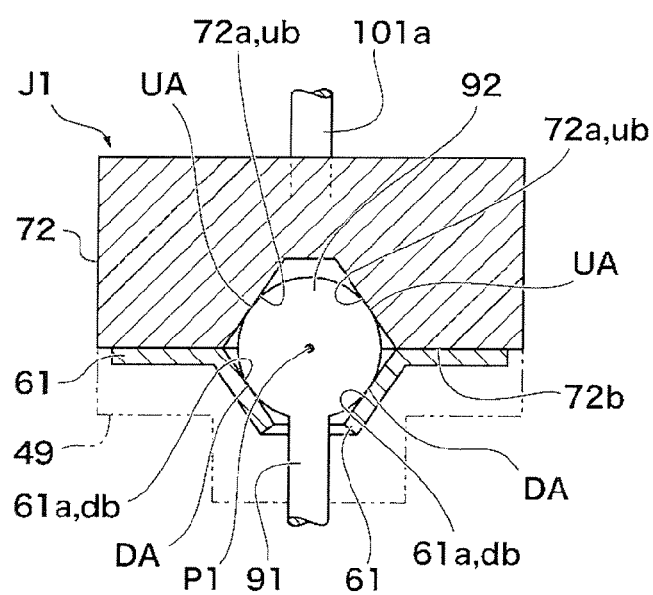
FIG. 6A is a vertical cross-sectional view showing one example of a first joint portion.
Figure 6B:
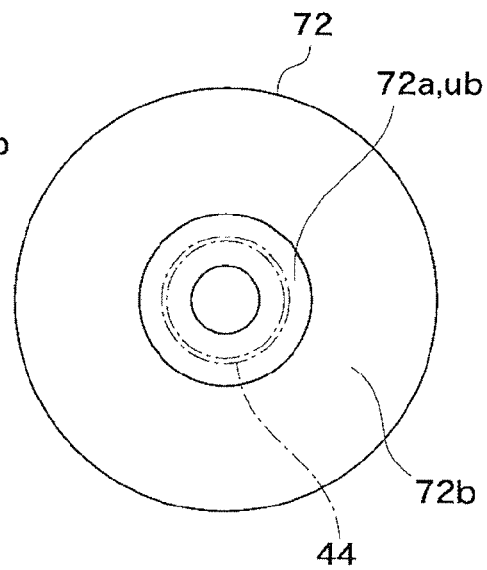
FIG. 6B is a view showing a lower surface of an upper member of the first joint portion.

FIG. 6A is a vertical cross-sectional view showing one example of the first joint portion J1. FIG. 6 and other drawings for explaining the joint portion J are schematic views, and the external appearance and the reduction scale thereof may differ from those of FIG. 4. It is noted, however, that there is no limitation to the external shape of the joint portion J. The first joint portion J1 has a ball joint structure including an upper member 72 and a spring 61 (as one example of an urging portion or a pushing portion). FIG. 6B is a view showing a back (lower) surface of the upper member 72. The upper member 72 is fixed to the first end portion 101a of the rod portion 101 of the connecting member R. A cover 49 is fixed to an underside of the upper member 72, so as to cover the spring 61.

As shown in FIG. 6A, the upper member 72 is provided with an upwardly recessed portion having a conical shape. The inner surface of the recessed portion is a tapered surface 72a. The spring 61 is an elastic member formed of metal or the like and having an annular plate-like shape. A radially outer portion of the spring 61 is fixed to a horizontal lower surface 72b of the upper member 72, and the spherical portion 92 of the rod portion 91 is disposed between a radially inner portion of the spring 61 and the tapered surface 72a of the upper member 72. The upper surface of the radially inner portion of the spring 61 is a tapered surface 61a. The elasticity of the spring 61 permits the tapered surface 61a thereof to urge the spherical portion 92 upward and thereby permits the spherical portion 92 to be kept pushed onto the tapered surface 72a of the upper member 72 all the time.

The spherical portion 92 contacts the tapered surface 72a of the upper member 72 on an annular tangent line 44, as shown in FIG. 6B. Similarly, the spherical portion 92 contacts the tapered surface 61a of the spring 61 on an annular tangent line (not shown). The tapered surface 72 of the upper member 72 functions as a pushing-side driven portion ub. A portion of the spherical portion 92 that is in contact with the pushing-side driven portion ub functions as a pushing-side driving portion UA. The tapered surface 61a of the spring 61 functions as a pulling-side driven portion db. A portion of the spherical portion 92 that is in contact with the pulling-side driven portion db functions as a pulling-side driving portion DA. There is thus established a sandwiching mechanism for sandwiching the spherical portion 92 on both of its upper and lower sides such that the spherical portion 92 is rotatable about the first pivot point P1 as a pivot center.

When the vibration unit 200 vibrates in an upward direction and a downward direction, it is necessary for the rod portion 91 (as the first member) to transmit an upward pushing force and a downward pulling force to the rod portion 101 (as the second member). When the vibration unit 200 moves upward, the pushing-side driven portion ub is driven in a pushing direction, i.e., the upward direction, by the pushing-side driving portion UA. When the vibration unit 200 moves downward, the pulling-side driven portion db is driven in a pulling direction, i.e., a downward direction, by the pulling-side driving portion DA.

If a space is formed between the pushing-side driving portion UA (the spherical portion 92) and the pushing-side driven portion ub (the tapered surface 72a) or between the pulling-side driving portion DA (the spherical portion 92) and the pulling-side driven portion db (the tapered surface 61a) in pushing and pulling actions of the rod portion 91 caused by the vibration of the vibration unit 200, the vibration is not properly transmitted. In this instance, there is a risk that an accurate vibrating function is not achieved. In addition, undesirable noise may be generated. In view of this, the present embodiment provides an urging portion configured to give an urging force by which the pushing-side driven portion ub is kept urged in the pushing direction all the time by the pushing-side driving portion UA and an urging force by which the pulling-side driven portion db is kept urged in the pulling direction all the time by the pulling-side driving portion DA.

The spring 61 mainly functions as the urging portion in the present embodiment. The present embodiment employs substantially a structure in which the spring 61 pushes the spherical portion 92 upward such that the pushing-side driving portion UA and the pushing-side driven portion ub are kept in contact with each other all the time and the pulling-side driving portion DA and the pulling-side driven portion db are kept in contact with each other all the time.

The spherical portion 92 contacts the tapered surface 72a of the upper member 72, whereby the position of the spherical portion 92 in the Z-axis direction is defined in the first joint portion H. Similarly, the spherical portion 102 contacts the tapered surface of the pointer member 111, whereby the position of the spherical portion 102 in the Z-axis direction is defined in the second joint portion J2.

When the pointer member 111 is inclined, by a displacement of the soundboard 7, in a direction that includes a component of the horizontal direction, namely, in a direction different from or intersecting the vibration direction, the spherical portion 102 can accordingly rotate in the second joint portion J2 about an axis perpendicular to the Z axis, e.g., about the X axis or the Y axis. Consequently, the connecting member R is permitted to be inclined about the second pivot point P2 relative to the Z axis without an excessively large force applied to the connecting member R.

When the connecting member R is displaced by a displacement of the soundboard 7, the tapered surfaces 72a, 61a can accordingly rotate in the first joint portion J1 relative to the spherical portion 92 about then axis perpendicular to the Z axis (e.g., the X axis or the Y axis). Consequently, the connecting member R is permitted to be inclined about the first pivot point P1 relative to the Z axis without an excessively large force applied to the connecting member R.

The rod portion 101, 91 is formed of metal, for instance. The rod portion 101, 91 is required to exhibit vibration transmitting property. Where the rod portion 101, 91 is formed of metal, the rod portion 101, 91 has a high degree of rigidity in the vibration direction and exhibits excellent vibration transmitting property. It is thus preferable to employ metal as the material for the rod portion 101, 91. The pointer member 111 and the upper member 72 are formed of resin, for instance, for ensuring a high degree of dimensional accuracy. The pointer member 111 and the upper member 72 may be formed of metal with vibration transmitting property and a dimensional change taken into consideration. The pointer member 111 and the upper member 72 may be formed such that a part thereof is formed of resin and another part thereof is formed of metal.

The damper 53 has a function of supporting the magnetic-path forming portion 52 such that the vibrating unit 200 can be displaced in the vibration direction that coincides with the Z-axis direction while the vibrating unit 200 is kept in coaxial alignment with the axis C1. The joint portions J1, J2 can follow a relatively slow horizontal displacement of the soundboard 7 caused by changes over time and have hardness that enables the joint portions J1, J2 to be bent to such an extent that a force can be transmitted, with respect to a motion in the vibration direction having a short cycle. A force by which the damper 53 permits the vibrating unit 200 to be kept coaxial with the axis C1 in the horizontal direction is made sufficiently larger than a force by which the joint portions J1, J2 resist bending with respect to the horizontal direction. When the soundboard 7 is displaced in the horizontal direction due to changes over time, the connecting member R is inclined owing to bending at the joint portions J1, J2. However, the damper 53 keeps holding the vibrating unit 200 such that the vibrating unit 200 is kept located at the same position in the horizontal direction.

The damper 53 may be formed such that its disc-like portion has a bellows-like shape in the entire circumferential direction. The damper 53 may be formed of resin having elasticity as long as the damper 53 permits the axis of the vibrating unit 200 and the bobbin 511 to be retained at a central portion thereof. Moreover, the damper 53 may be configured to hold the axis of the vibrating unit 200 and the bobbin 511 at several locations in the circumferential direction, instead of holding the same over the entire circumferential direction.

According to the embodiment, when the vibration unit 200 vibrates, the spring 61 as the urging portion permits the pushing-side driving portion UA and the pushing-side driven portion ub to be kept in contact with each other all the time and permits the pulling-side driving portion DA and the pulling-side driven portion db to be kept in contact with each other all the time, in the joint portion J. Consequently, the driving-force transmitting structure in the joint portion j does not suffer from the above-indicated space formed between the pushing-side driving portion UA and the pushing-side driven portion ub or between the pulling-side driving portion DA and the pulling-side driven portion db. In other words, the rod portion 91 as the first member and the rod portion 101 as the second member are firmly made integral or unified with each other by the urging force of the spring 61, so that vibration is transmitted without a loss. Consequently, accurate vibration transmission is ensured. In addition, mechanical noise such as chattering noise is not likely to be generated. In the present embodiment, the urging force by the spring 61 keeps acting all the time. Thus, even when the joint portion J suffers from wear or deformation during a long-term use, the above-indicated space which would be otherwise formed due to changes over time is not formed. It is accordingly possible to prevent generation of noise and to ensure a proper vibrating function for a long period of time.

According to the present embodiment, when the portion of the soundboard 7 to which the connecting member R is connected is displaced in the horizontal direction within a predetermined range, the second joint portion J2 is displaced in the horizontal direction owing to bending at the joint portions J1, J2 to cause inclination of the connecting member R while the vibrating unit 200 is prevented from being inclined and displaced in the horizontal direction. Thus, the vibrating unit 200 is kept located at the same position in the horizontal direction. As a result, even when the soundboard 7 suffers from a dimensional change in the direction perpendicular to the vibration direction due to changes over time, the electromagnetic coupling between the magnetic-path forming portion 52 and the electromagnetic coupling portion EM can be maintained and the acoustic transducer 50 can maintain an appropriate vibrating function over a long period of time.

Figure 6C:
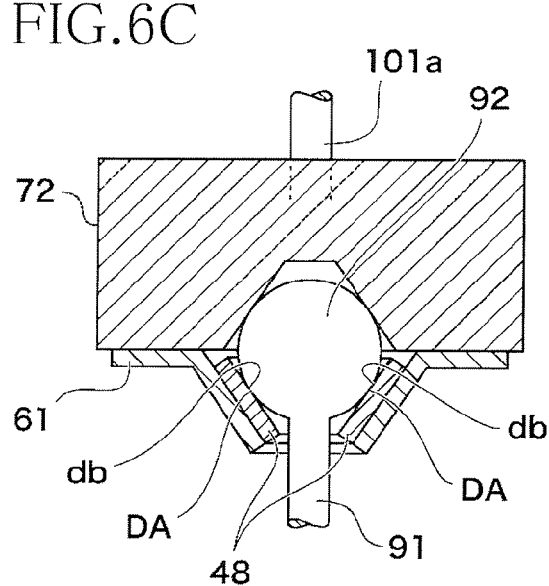
FIG. 6C is a view showing a modified example of the first joint portion.

In the present embodiment, the spring 61 directly pushes the spherical portion 92. In view of wear resistance of portions that are held in contact with each other, it is preferable to provide a cushioning member 48 between the spring 61 and the spherical portion 92, as shown in FIG. 6C. The cushioning member 48 may be provided on one of or both of the spring 61 and the spherical portion 92. When the cushioning member 48 is provided on the spring 61, as shown in FIG. 6C, an upper tapered surface of the annular cushioning member 48 corresponds to the pulling-side driven portion db to be driven by the pulling-side driving portion DA of the spherical portion 92.

Figure 6D:
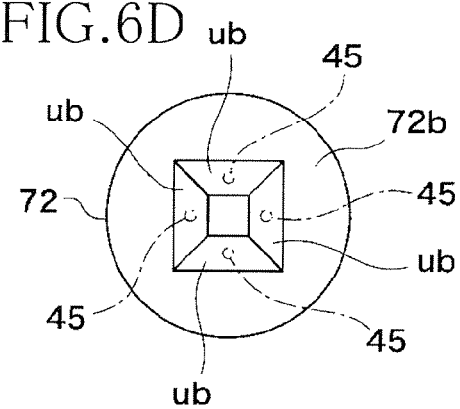
FIGS. 6D and 6E are views showing modified examples of the upper member.
Figure 6E:
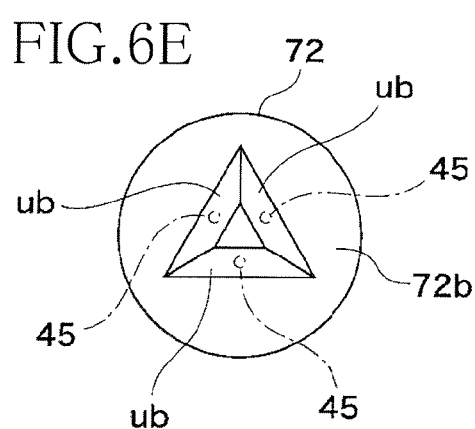

In the present embodiment, the tapered surface 72a of the upper member 72 is given by a part of the conical recess. The tapered surface may be otherwise given. For instance, a plurality of tapered surfaces (the pushing-side driven portions ub) may be given by four faces of a quadrangular pyramid, and the pushing-side driving portion UA of the spherical portion 92 may be in contact with the tapered surfaces at respective contact points 45, as shown in FIG. 6D. Alternatively, a plurality of tapered surfaces (the pushing-side driven portions ub) may be given by three faces of a triangular period, and the pushing-side driving portion UA of the spherical portion 92 may be in contact with the tapered surfaces at respective contact points 45, as shown in FIG. 6E.

The position of the spherical portion 92 in the horizontal direction needs to be defined by a contact of the spherical portion 92 with the tapered surface/surfaces. In view of this, a plurality of faces of polygonal pyramid, besides the triangular pyramid and the quadrangular pyramid, may give a plurality of tapered surfaces. These modifications of the tapered surfaces based on the shapes other than the conical shape are applicable to the tapered surface of the spring 61.

Thus, the spherical portion 92 and the tapered surface are in a line contact in FIG. 6B and in a point contact in FIG. 6D. To avoid formation of the above-indicated space between the pushing-side driving portion UA and the pushing-side driven portion ub or between the pulling-side driving portion DA and the pulling-side driven portion db, the shape of the tapered surface in the vertical cross-sectional view need not be necessarily flat, but may be a gentle concave curved surface or a gentle convex curved surface in the vertical cross-sectional view. The spherical portion 92 that is in contact with the tapered surface has a substantially spherical shape in the present embodiment. The spherical portion 92 may have any convex curved surface, such as an incomplete spherical shape, that enables a proper driving state to be maintained. This is applicable to modified examples explained below.

Referring next to FIGS. 7-9, joint portions J according to modified examples that employ various urging portions will be explained taking the first joint portion J1 as an example.

Figure 7A:
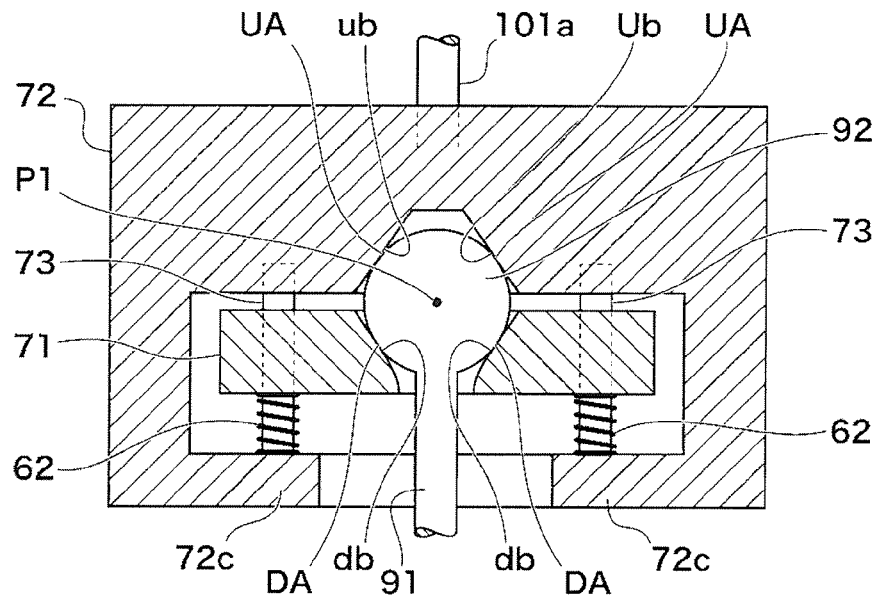
FIGS. 7A-7C are vertical cross-sectional views showing first joint portions according to first through third modified examples.
Figure 7B:
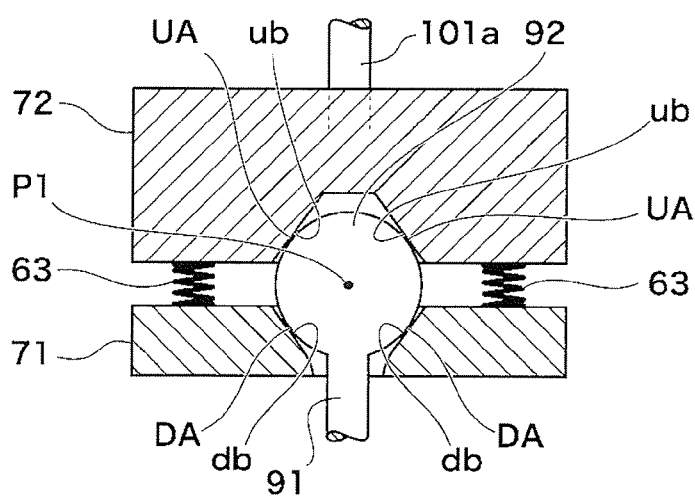
Figure 7C:
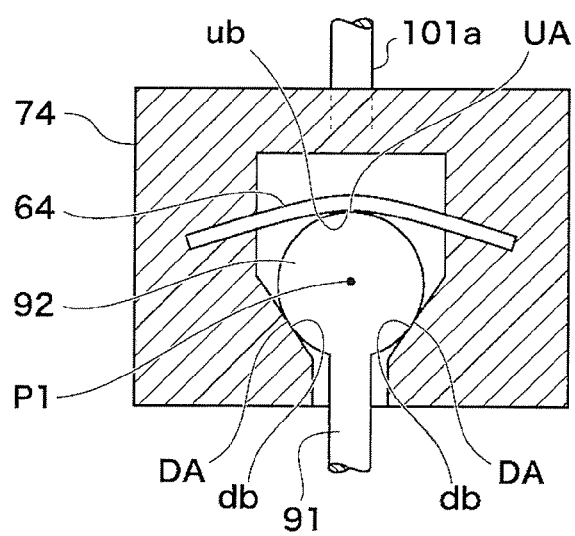

FIGS. 7A-7C are vertical cross-sectional views respectively showing first joint portions J1 according to first through third modified examples.

In the first modified example shown in FIG. 7A, the first joint portion J1 has a lower member 71 having a tapered surface that is in an inverted relation to the tapered surface (the pushing-side driven portion ub) of the upper member 72. The tapered surface (the pushing-side driven portion ub) of the upper member 72 and the tapered surface (the pulling-side driven portion db) of the lower member 71 cooperate with each other to sandwich the spherical portion 92 on its upper and lower sides such that the spherical portion 92 is rotatable about the first pivot point P1 as the pivot center.

Specifically, a flange portion 72c is formed at a lower-side portion of the upper member 72. The flange portion 72c has a through-hole through which the rod portion 91 passes. The lower member 71 is disposed between an upper-side portion of the upper member 72 and the flange portion 72c, such that the lower member 71 is movable in the vertical direction along guide shafts 73. A plurality of coil springs 62 are interposed, in a compression state, between the lower member 71 and the flange portion 72c, whereby the lower member 71 is kept urged upward all the time. The coil spring 62 as the urging portion permits the pushing-side driving portion UA and the pushing-side driven portion ub to be kept in contact with each other all the time and permits the pulling-side driving portion DA and the pulling-side driven portion db to be kept in contact with each other all the time. Thus, no space is formed between the pushing-side driving portion UA and the pushing-side driven portion ub or between the pulling-side driving portion DA and the pulling-side driven portion db.

In the second modified example 2 shown in FIG. 7B, a plurality of coil springs 63 each as the urging portion are interposed, in a tension state, between the upper member 72 and the lower member 71. As in the modified example 1, the tapered surface (the pushing-side driven portion ub) of the upper member 72 and the tapered surface (the pulling-side driven portion db) of the lower member 71 cooperate with each other to sandwich the spherical portion 92 on its upper and lower sides.

In the third modified example shown in FIG. 7C, the spherical portion 92 is disposed in a block 74, and a plate spring 64 as the urging portion is provided in the block 74 so as to be disposed on the spherical portion 92. The upper end of the spherical portion 92 is pushed downward by the elasticity of the plate spring 64. A tapered surface formed in the block 74 and facing upward functions as the pulling-side driven portion db and is kept in contact with the pulling-side driving portion DA all the time. The upper end of the spherical portion 92 functions as the pushing-side driving portion UA and is kept in contact with the lower surface of the plate spring 64 all the time that functions as the pushing-side driven portion ub.

FIGS. 8A-8D are vertical cross-sectional views respectively showing first joint portions J1 according to fourth through seventh modified examples.

Figure 8A:
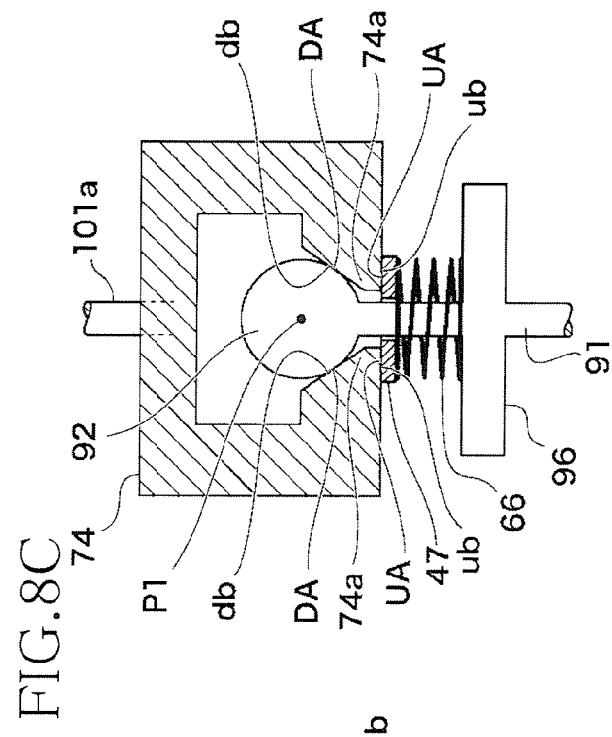
FIGS. 8A-8D are vertical cross-sectional views showing first joint portions according to fourth through seventh modified examples.

In the modified example 4 shown in FIG. 8A, a plurality of coil springs 65 each as the urging portion are interposed, in a tension state, between the upper member 72 and the lower member 71. It is noted that each coil spring 65 is disposed so as to generate a tensile force in the horizontal direction. A conical recess of the upper member 72 is formed such that the axis of the conical shape of the recess is inclined with respect to the Z-axis direction. FIG. 8A is a vertical cross-sectional view along the axis of the conical shape of the recess that provides the tapered surface of the upper member 72. A tapered surface formed in the lower member 71 is flat and faces toward the tip of the conical shape of the recess formed in the upper member 72.

The upper member 72 and the lower member 71 pull each other in the left-right direction in FIG. 8A owing to the tensile force of the coil springs 65, whereby the spherical portion 92 is sandwiched by the tapered surface of the lower member 71 and the tapered surface of the upper member 72. The tapered surface of the lower member 71 that functions as the pulling-side driven portion db is kept in point contact with the pulling-side driving portion DA of the spherical portion 92 all the time. At the same time, the tapered surface of the upper member 72 that functions as the pushing-side driven portion ub is kept in a line contact with the pushing-side driving portion UA of the spherical portion 92 all the time.

Figure 8C:
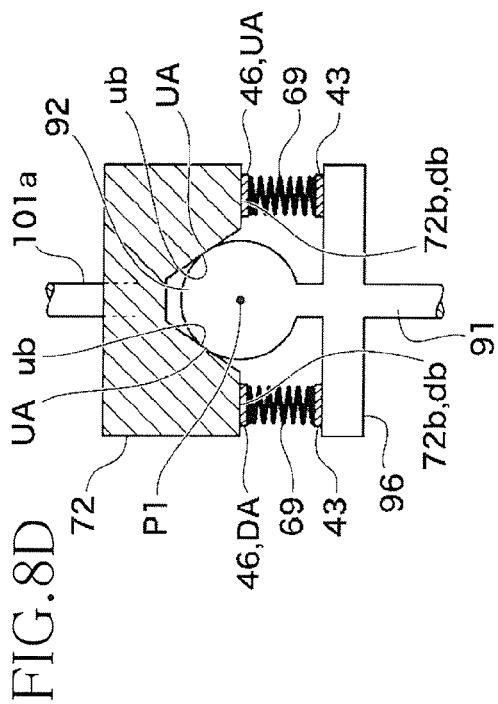
Figure 8B:
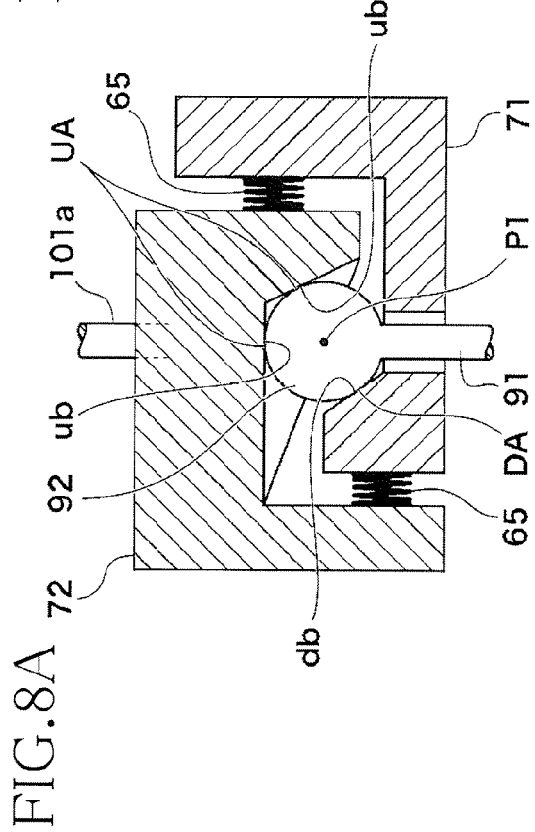

In the modified example 5 shown in FIG. 8B, a plurality of coil springs 65 each as the urging portion are interposed, in a tension state, between a first block 77 and a second block 76, such that the coil springs 65 generate a tensile force in the horizontal direction, as in the modified example 4 shown in FIG. 8A. A conical recess formed in the first block 77 faces a conical recess formed in the second block 76. The axes of the conical shapes of the respective recesses are coaxial with or aligned with each other and are orthogonal to the Z-axis direction. FIG. 8B is a vertical cross-sectional view along the axes of the conical shapes of the recesses formed in the first block 77 and the second block 76.

The first block 77 and the second block 76 pull each other in the left-right direction in FIG. 8B owing to the tensile force of the coil springs 65, whereby the spherical portion 92 is sandwiched by the tapered surface of the first block 77 and the tapered surface of the second block 76 in the horizontal direction. A portion of the tapered surface of the first block 77 and a portion of the tapered surface of the second block 76 that are in contact with the upper portion of the spherical portion 92 function as the pushing-side driven portions ub while a portion of the tapered surface of the first block 77 and a portion of the tapered surface of the second block 76 that are in contact with the lower portion of the spherical portion 92 function as the pulling-side driven portions db. A portion of the upper portion of the spherical portion 92 that is in contact with the tapered surfaces (the pushing-side driven portions ub) of the respective blocks 77, 76 function as the pushing-side driving portion UA while a portion of the lower portion of the spherical portion 92 that is in contact with the tapered surfaces (the pulling-side driven portions db) of the respective blocks 77, 76 functions as the pulling-side driving portion DA.

According to the modified examples 4 (FIG. 8A) and 5 (FIG. 8B), the pushing-side driving portion UA and the pushing-side driven portion ub are kept in contact with each other all the time, and the pulling-side driving portion DA and the pulling-side driven portion db are kept in contact with each other all the time. Consequently, no space is formed between the pushing-side driving portion UA and the pushing-side driven portion ub or between the pulling-side driving portion DA and the pulling-side driven portion db, as in the structures shown in FIGS. 6A, 6C, and 7A-7C. In addition, the modified examples 4 (FIG. 8A) and 5 (FIG. 8B) are advantageous in that, in transmission of the drive forces of the pushing-side driving portion UA and the pulling-side driving portion DA generated when the vibration unit 200 vibrates, the coil springs 65 do not directly receive the vibration.

In the modified example 6 shown in FIG. 8C, the first end portion 101a of the rod portion 101 is fixed to the block 74. A tapered surface functioning as the pulling-side driven portion db is formed at a lower-side portion 74a of the block 74, and the spherical portion 92 is provided in the block 74 so as to be disposed on the pulling-side driven portion db. Further, a coil spring 66 as the urging portion is interposed, in a compression state, between a flange portion 96 provided on the rod portion 91 and the lower-side portion 74a of the block 74. An attachment 47 in the form of a washer is provided at an upper end of the coil spring 66.

Owing to the compressive force of the coil spring 66, the attachment 47 keeps pushing the lower-side portion 74a upward all the time, and the lower portion of the spherical portion 92 that functions as the pulling-side driving portion DA keeps pushing the pulling-side driven portion db of the block 74 downward all the time.

In the modified example 6 of FIG. 8C, when the rod portion 91 moves upward by vibration of the vibration unit 200, the lower-side portion 74a of the block 74 is driven to be pushed upward by the attachment 47 via the flange portion 96 and the coil spring 66. Thus, the upper surface of the attachment 47 functions as the pushing-side driving portion UA while the lower surface of the lower-side portion 74a functions as the pushing-side driven portion ub. When the rod portion 91 moves downward by vibration of the vibration unit 200, the pulling-side driven portion db of the block 74 is driven to be pushed downward by the pulling-side driving portion DA of the spherical portion 92.

In the modified example 6 of FIG. 8C, since the coil spring 66 that is a compression spring is directly involved in transmission of a driving force from the block 74 to the rod portion 91 when the vibration unit 200 moves upward, the spring constant and the attaching state of the coil spring 66 are important. In view of this, the spring constant of the coil spring 66 is set to be relatively large so as to prevent excessive deformation of the coil spring 66 even by a maximum driving force in the upward direction generated by the vibration unit 200. Further, the attaching structure of the coil spring 66 and the attachment 47 is designed to have a high strength.

Figure 8D:
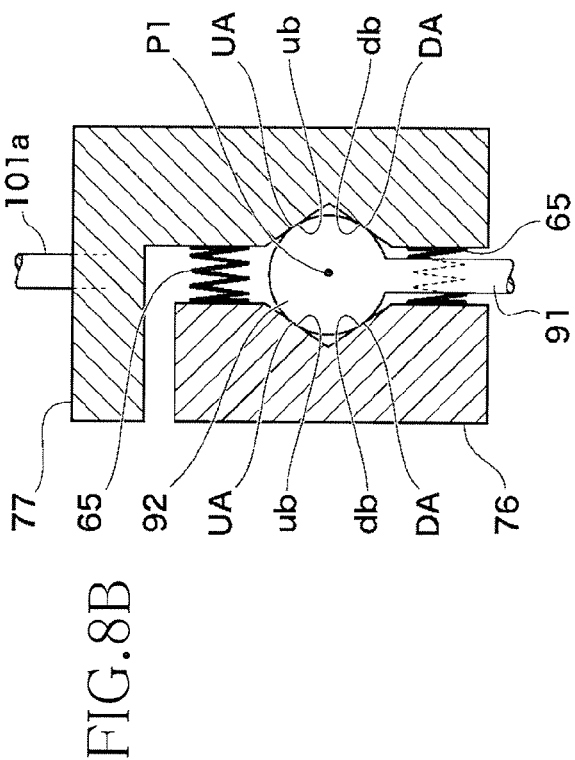

In the modified example 7 shown in FIG. 8D, the upper member 72 to which the first end portion 101a of the rod portion 101 is fixed has a tapered surface functioning as the pushing-side driven portion ub, as in the embodiment of FIG. 6A. A portion of the spherical portion 92 that is in contact with the pushing-side driven portion ub functions as the pushing-side driving portion UA. A plurality of coil springs 69 each as the urging portion is interposed, in a tension state, between the flange portion 96 of the rod portion 91 and the lower surface 72b of the upper member 72. The coil springs 69 are disposed around the rod portion 91.

Each coil spring 69 is attached to a corresponding one of attachments 46 fixed to the lower surface 72b of the upper member 72 and a corresponding one of attachments 43 fixed to the upper surface of the flange portion 96. The coil springs 69 keep generating a tensile force in the vertical direction with respect to the attachment 46 and the attachment 43. Owing to the tensile force of the coil springs 69, the pushing-side driving portion UA and the pushing-side driven portion ub are kept in a pushed state all the time and the lower surface 72b of the upper member 72 is kept pulled downward all the time.

In the modified example 7 of FIG. 8D, when the rod portion 91 moves upward by vibration of the vibration unit 200, the pushing-side driven portion ub of the upper member 72 is driven to be pushed upward by the pushing-side driving portion UA the spherical portion 92. When the rod portion 91 moves downward by vibration of the vibration unit 200, the lower surface 72b of the upper member 72 is driven to be pulled downward via the flange portion 96, the attachments 43, the coil springs 69, and the attachments 46. Thus, the upper surface of each attachment 46 functions as the pulling-side driving portion DA while the lower surface 72b of the upper member 72 functions as the pulling-side driven portion db.

In the modified example 7 of FIG. 8D, each coil spring 69 that is a tension spring is directly involved in transmission of a pulling driving force from the rod portion 91 to the upper member 72 when the vibration unit 200 moves downward. In view of this, the spring constant and the attaching state of the coil spring 69 are set and designed, as in the modified example 6 of FIG. 8C, so as to prevent excessive deformation of the coil spring 69 even by a maximum driving force in the downward direction generated by the vibration unit 200.

Figure 9A:
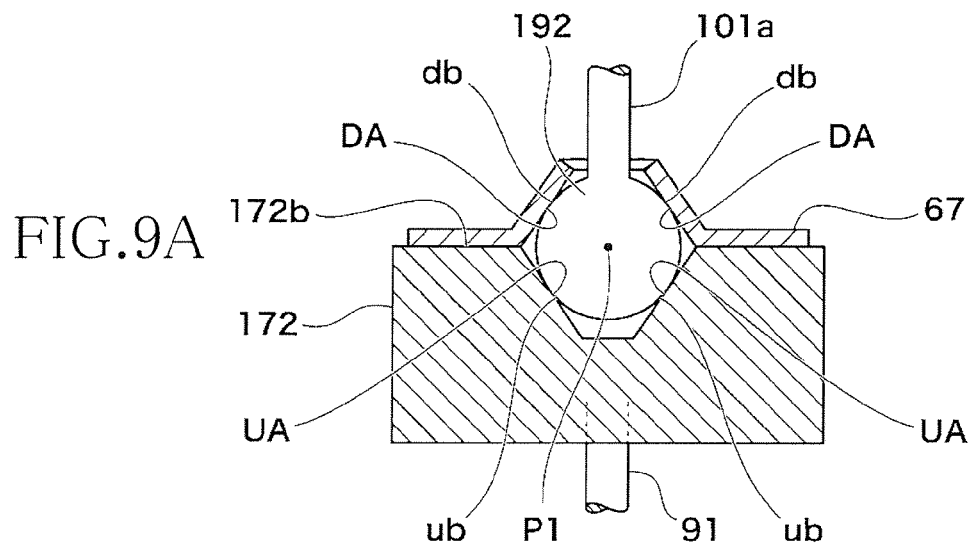
FIGS. 9A-9C are vertical cross-sectional views showing first joint portions according to eighth through tenth modified examples.
Figure 9B:
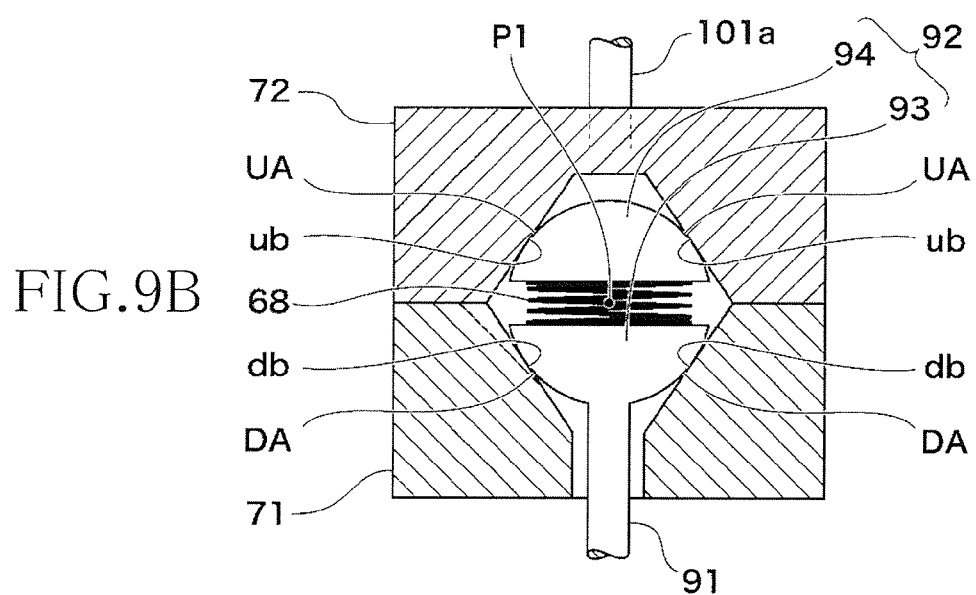
Figure 9C:
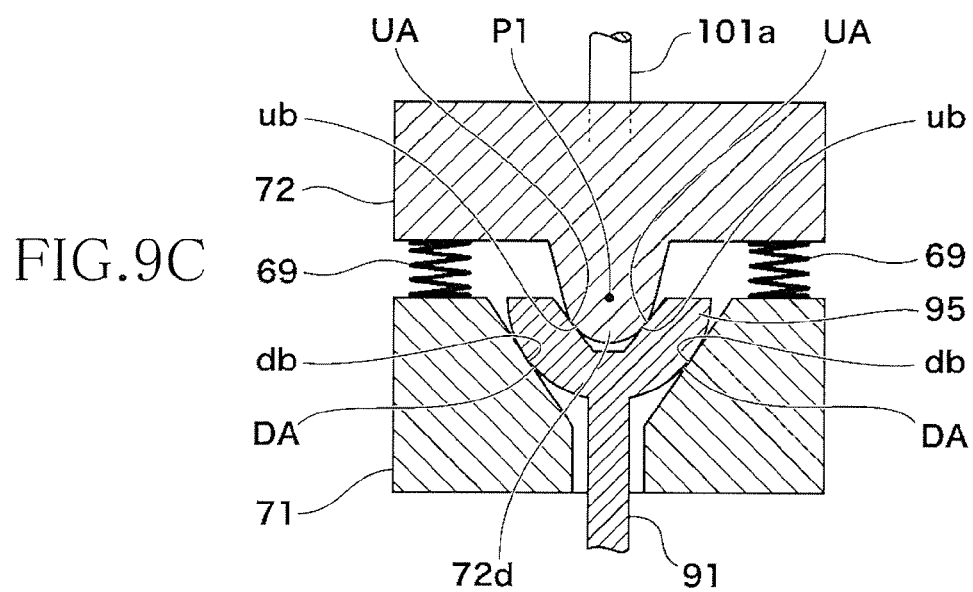

FIGS. 9A-9C are vertical cross-sectional views respectively showing first joint portions J1 according to modified examples 8-10.

The joint portion J1 of the modified example 8 shown in FIG. 9A has a structure having an inverted relation to the structure of the joint portion J1 shown in FIG. 6A. In the modified example 8, a spherical portion 192 is fixed to the first end portion 101a of the rod portion 101, in place of the upper member 72 in the embodiment of FIG. 6A. Further, a lower member 172 is fixed to the upper end portion of the rod portion 91, in place of the spherical portion 92 in the embodiment of FIG. 6A. A spring 67 (as the urging portion) corresponding to the spring 61 in FIG. 6A is fixed to an upper surface 172b of the lower member 172.

A lower surface of a radially inner portion of the spring 67 is a tapered surface (functioning as the pulling-side driving portion DA). Owing to the elasticity of the spring 67, the tapered surface (the pulling-side driving portion DA) of the spring 67 is kept in contact with the pulling-side driven portion db of the spherical portion 192 all the time and urges the spherical portion 192 downward. A tapered surface formed in the lower member 172 functions as the pushing-side driving portion UA and is kept in contact with the lower portion of the spherical portion 192 (functioning as the pushing-side driven portion ub all the time.

The spherical portion 192 is rotatale about the first pivot point P1 as the pivot center relative to the tapered surface (the pulling-side driving portion DA) of the spring 67 and the tapered surface (the pushing-side driving portion UA) of the lower member 172. Thus, the first joint portion J1 of the modified example 8 acts in a manner similar to that of the first joint portion J1 of the embodiment of FIG. 6A. The spring 67 permits the pushing-side driving portion UA and the pushing-side driven portion ub to be kept in contact with each other all the time and permits the pulling-side driving portion DA and the pulling-side driven portion db to be kept in contact with each other all the time. Consequently, the first joint portion J1 of the modified example 8 is free from a problem of formation of a space between the pushing-side driving portion UA and the pushing-side driven portion ub or between the pulling-side driving portion DA and the pulling-side driven portion db.

Inverting the structure as described above is applicable to not only the joint portion J shown in FIGS. 6A and 6C, but also the joint portions J according to the modified examples that are illustrated above and that will be explained below. Thus, one of the pushing-side driving portion UA and the pushing-side driven portion ub may have the convex curved surface and the other of the pushing-side driving portion UA and the pushing-side driven portion ub may have the tapered surface, and one of the pulling-side driving portion DA and the pulling-side driven portion db may have the convex curved surface and the other of the pulling-side driving portion DA and the pulling-side driven portion db may have the tapered surface.

In the modified example 9 shown in FIG. 9B, the upper member 72 and the lower member 71 are fixed to each other by screws or the like not shown. A tapered surface (functioning as the pushing-side driven portion ub) of the upper member 72 and a tapered surface (functioning as the pulling-side driven portion db) of the lower member 71 sandwich the spherical portion 92 on its upper and lower sides such that the spherical portion 92 is rotatable about the first pivot point P1 as the pivot center.

In the modified example 9 of FIG. 9B, the spherical portion 92 of the rod portion 91 is constituted by two parts, i.e., a lower hemispherical portion 93 and an upper hemispherical portion 94. A coil spring 68 as the urging portion is interposed, in a compression state, between the lower hemispherical portion 93 and the upper hemispherical portion 94. The coil spring 68 in the compression state permits the convex curved surface (functioning as the pushing-side driving portion UA) of the upper hemispherical portion 94 to be kept in contact with the tapered surface (functioning as the pushing-side driven portion ub) of the upper member 72 all the time and permits the convex curved surface (functioning as the pulling-side driving portion DA) of the lower hemispherical portion 93 to be kept in contact with the tapered surface (the pulling-side driven portion db) of the lower member 71 all the time. Consequently, each of the lower hemispherical portion 93 and the upper hemispherical portion 94 has substantially the same contour as that of a corresponding portion of the spherical portion 92.

The upper hemispherical portion 94 is required to have the convex curved surface in at least an area thereof that is in contact with the pushing-side driven portion ub while the lower hemispherical portion 93 is required to have the convex curved surface in at least an area thereof that is in contact with the pulling-side driven portion db.

In the modified example 10 shown in FIG. 9C, the member having the convex curved surface is not limited to only one of the first member and the second member, namely, both of the first member and the second member may have the convex curved surface. The upper member 72 has, at its lower end, a convex curved surface portion 72d protruding downward and having a hemispherical shape. The rod portion 91 has, at its upper end, a bowl-like portion 95, in place of the spherical portion 92. The lower surface of the bowl-like portion 95 is a convex curved surface protruding downward and functioning as the pulling-side driving portion DA. The bowl-like portion 95 is provided with a tapered surface formed in its upper portion. This tapered surface functions as the pushing-side driving portion UA. The tapered surface formed in the lower member 71 functions as the pulling-side driven portion db.

A plurality of coil springs 69 each as the urging portion are interposed, in a tension state, between the upper member 72 and the lower member 71, whereby the convex curved surface portion 72d of the upper member 72 that functions as the pushing-side driven portion ub is kept in contact with the tapered surface (functioning as the pushing-side driving portion UA) of the lower member 71 all the time. At the same time, the convex curved surface (functioning as the pulling-side driving portion DA) of the bowl-like portion 95 is kept in contact with the tapered surface (functioning as the pulling-side driven portion db) of the lower member 71 all the time.

The center of curvature of the convex curved surface portion 72d of the upper member 72 and the center of curvature of the convex curved surface of the bowl-like portion 95 coincide with the first pivot point P1. Consequently, the convex curved surface portion 72d and the bowl-like portion 95 are rotatable about the first pivot point P1 as the pivot center.

Provision of a member like the cushioning member 48 between the pushing-side driving portion UA and the pushing-side driven portion ub and/or between the pulling-side driving portion DA and the pulling-side driven portion db is applicable to all of the embodiment and modifies examples.

The present invention is applicable to a structure in which at least one the joint portion J connects: a part of the soundboard 7 or the fixed portion fixed with respect to the soundboard 7; and the vibration unit 200 and in which vibration of the vibration unit 200 is transmitted to the soundboard 7 via the joint portion J. One or three or more joint portions J may be provided.

When one joint portion J is provided, the joint portion J is preferably disposed as close as possible to the soundboard 7, and the rod portion 101 preferably has a long length and flexibility. Also in this configuration, the damper 53 restricts the movement of the electromagnetic coupling portion EM in the horizontal direction at a position close to the magnetic-path forming portion 52, and the axis of the rod portion 91 is kept in parallel with the Z axis in a range near the magnetic-path forming portion 52. When one joint portion J is provided, the sandwiching mechanism of FIG. 6A constituted by the upper member and its tapered surface, the spherical portion, and the spring and its tapered surface is provided for the one joint portion J.

The joint portion J to which the present invention is applied may have any suitable structure other than the ball joint structure. That is, it is only required for the joint portion J to have a structure that enables axes of respective two members connected thereto to be inclined relative to each other owing to bending at the joint portion J, namely, a structure that enables objects connected to each other by the joint portion J to be inclined relative to each other owing to bending, and the motion that causes bending is not limited to a pivotal motion. The spherical portion is kept pushed onto the tapered surface all the time in the joint portion in the illustrated embodiment and modified examples. As long as a proper vibrating function can be maintained, the spherical portion may be temporarily separated away from the tapered surface. In other words, it is permissible that the urging force from the spherical portion to the tapered surface or vice versa is not temporarily generated, as long as a proper vibrating function can be maintained.

Each of two or more joint portions J may have mutually different structures. Only one of two or more joint portions J may have the sandwiching mechanism or the like shown in FIG. 6A and so on. Only two of three or more joint portions J may have the sandwiching mechanism or the like shown in FIG. 6A and so on.

The soundboard 7 is illustrated as one example of the vibrated body to be vibrated. In addition, the invention is applicable to a structure in which any other member, such as a roof or a side board, which undergoes a dimensional change functions as the vibrated body to be vibrated. Even in an instance where the vibrated body does not undergo the dimensional change, the invention is useful when the vibrated body is relatively displaced by a dimensional change or deformation of a member that supports the acoustic transducer, in a direction different from or intersecting the vibration direction.

The piano to which the principle of the invention is applicable may be a grand piano or an upright piano. The present invention is applicable to not only the pianos but also various acoustic musical instruments having the acoustic transducer, electronic musical instruments having the acoustic transducer, and speakers. When the invention is applied to the acoustic musical instruments, the electronic musical instruments, and the speakers, the vibrated body that can be forcibly vibrated needs to be provided therein. The present invention is applicable to any structure in which the position at which the vibrated body is connected to the movable unit and the position at which the acoustic transducer is supported relatively shift in a direction different from the vibration direction due to a dimensional change or the like.

The present invention is preferably applied to the soundboard as the vibrated body of acoustic musical instruments and electronic musical instruments. Further, the present invention is preferably applied to a wooden vibrating plate as the vibrated body of speakers.

It is not essential to provide the key drive units 30 for the automatic performance function or the stoppers 40 for the sound silencing function.

While the embodiment and modified examples of the present invention have been described in detail, it is to be understood that the present invention is not limited to the details of the illustrated embodiment and modified examples, but may be otherwise embodied without departing from the spirit and the scope of the invention defined in the attached claims. The illustrated embodiment and the modified examples may be partially combined.

What is claimed is:

1. An installation structure for an acoustic transducer configured to operate in accordance with an audio signal and to push and pull a vibrated body in predetermined directions for thereby vibrating the vibrated body, so as to permit the vibrated body to generate sounds, comprising:
   a magnetic-path forming portion fixedly disposed relative to a fixedly supporting portion and forming a magnetic path;
   a vibrating unit having an electromagnetic coupling portion electromagnetically coupled to the magnetic-path forming portion, the vibrating unit being configured to vibrate in the predetermined directions when the electromagnetic coupling portion is driven by the magnetic-path forming portion in response to a drive signal based on the audio signal;
   a connector having at least one joint portion configured to connect two members such that axes of the two members are inclined relative to each other by bending at the at least one joint portion, the connector connecting (a) a part of the vibrated body or a fixed portion fixed to the vibrated body and (b) the vibrating unit,
   wherein a first member that is connected to the at least one joint portion on one of opposite sides thereof nearer to the fixedly supporting portion is provided with a pushing-side driving portion to drive the vibrated body in a pushing direction of the predetermined directions and a pulling-side driving portion to drive the vibrated body in a pulling direction of the predetermined directions,
   wherein a second member that is connected to the at least one joint portion on the other of the opposite sides thereof nearer to the vibrated body is provided with a pushing-side driven portion to be driven by the pushing-side driving portion in the pushing direction and a pulling-side driven portion to be driven by the pulling-side driving portion in the pulling direction, and
   wherein the at least one joint portion has an urging portion configured to generate an urging force by which the pushing-side driven portion is urged by the pushing-side driving portion in the pushing direction and an urging force by which the pulling-side driven portion is urged by the pulling-side driving portion in the pulling direction.

2. The installation structure for the acoustic transducer according to claim 1, wherein the urging portion is configured to generate the urging force by which the pushing-side driven portion is kept urged all the time by the pushing-side driving portion and the urging force by which the pulling-side driven portion is kept urged all the time by the pulling-side driving portion.

3. The installation structure for the acoustic transducer according to claim 1, wherein the electromagnetic coupling between the magnetic-path forming portion and the electromagnetic coupling portion, and transmission property of transmitting vibration of the vibrating unit to the vibrated body are maintained by the bending at the at least one joint portion even if the part of the vibrated body or the fixed portion is displaced relative to the fixedly supporting portion within a predetermined range in a direction intersecting the predetermined directions.

4. The installation structure for the acoustic transducer according to claim 1, wherein the bending at the at least one joint portion enables the first member and the second member to be inclined relative to each other in any direction intersecting the predetermined directions.

5. The installation structure for the acoustic transducer according to claim 1,
   wherein one of the pushing-side driving portion and the pushing-side driven portion has a convex curved surface while the other of the pushing-side driving portion and the pushing-side driven portion has at least one tapered surface, and
   wherein one of the pulling-side driving portion and the pulling-side driven portion has a convex curved surface while the other of the pulling-side driving portion and the pulling-side driven portion has at least one tapered surface.

6. The installation structure for the acoustic transducer according to claim 5, wherein the other of the pulling-side driving portion and the pulling-side driven portion has a plurality of tapered surfaces each as the at least one tapered surface, and wherein each of the plurality of tapered surfaces is held in a point contact with the convex curved surface of the one of the pulling-side driving portion and the pulling-side driven portion.

7. The installation structure for the acoustic transducer according to claim 1, wherein the at least one joint portion has: a spherical portion having a substantially spherical shape and provided at one of the first member and the second member; and a sandwiching mechanism provided at the other of the first member and the second member and having a tapered surface that contacts the spherical portion, the sandwiching mechanism being configured to rotatably sandwich the spherical portion by the urging force of the urging portion.

8. The installation structure for the acoustic transducer according to claim 1, wherein the urging portion is an elastic member.

9. The installation structure for the acoustic transducer according to claim 1, wherein the at least one joint portion is one joint portion that connects (a) the part of the vibrated body or the fixed portion and (b) the vibrating unit, and wherein the urging portion is provided at the one joint portion.

10. The installation structure for the acoustic transducer according to claim 1, wherein the connector comprises a connecting member disposed between (a) the part of the vibrated body or the fixed portion and (b) the vibrating unit and configured to transmit vibration of the vibrating unit to the vibrated body, and wherein the at least one joint portion includes: a first joint portion configured to connect a first end portion of the connecting member to the vibrating unit so as to enable the connecting member to be inclined with respect to an axis extending in the predetermined directions; and a second joint portion configured to connect a second end portion of the connecting member to the part of the vibrated body or to the fixed portion so as to enable the connecting member to be inclined with respect to the axis extending in the predetermined directions.

11. The installation structure for the acoustic transducer according to claim 10, wherein the urging portion is provided at each of the first joint portion and the second joint portion.

12. The installation structure for the acoustic transducer according to claim 10, wherein the urging portion is provided at the first joint portion and is not provided at the second joint portion.

13. The installation structure for the acoustic transducer according to claim 10, wherein the urging portion is provided at the second joint portion and is not provided at the first joint portion.

14. The installation structure for the acoustic transducer according to claim 1, wherein the vibrated body is a soundboard of a musical instrument.

15. An installation structure for an acoustic transducer configured to operate in accordance with an audio signal and to push and pull a vibrated body in predetermined directions for thereby vibrating the vibrated body, so as to permit the vibrated body to generate sounds, comprising:

a magnetic-path forming portion fixedly disposed relative to a fixedly supporting portion and forming a magnetic path:

a vibrating unit having an electromagnetic coupling portion electromagnetically coupled to the magnetic-path forming portion, the vibrating unit being configured to vibrate in the predetermined directions when the electromagnetic coupling portion is driven by the magnetic-path forming portion in response to a drive signal based on the audio signal; and a connector having at least one joint portion configured to connect two members such that axes of the two members are inclined relative to each other by bending at the at least one joint portion, the connector connecting (a) a part of the vibrated body or a fixed portion fixed to the vibrated body and (b) the vibrating unit, wherein the at least one joint portion has:

a first member located on one of opposite sides of the at least one joint portion nearer to the fixedly supporting portion;

a second member located on the other of the opposite sides of the at least one joint portion nearer to the vibrated body;

a spherical portion fixed to one of the first member and the second member, the spherical portion contacting the other of the first member and the second member; and a pushing portion fixed to the other of the first member and the second member, the pushing portion being configured to push the spherical portion onto the other of the first member and the second member in a state in which the pushing portion is in contact with the spherical portion.

* * * * *